United States Patent [19]
Wallis et al.

[11] 3,816,304
[45] June 11, 1974

[54] FILTERING METHOD

[75] Inventors: Craig Wallis; Joseph L. Melnick, both of Houston, Tex.

[73] Assignee: The Carborundum Company, Niagara Falls, N.Y.

[22] Filed: Oct. 27, 1971

[21] Appl. No.: 192,890

[52] U.S. Cl................. 210/36, 210/73, 210/497.1, 210/502, 210/504
[51] Int. Cl...................... B01d 15/00, B01d 39/06
[58] Field of Search............... 210/64, 73, 501–505, 210/497.1, 198; 55/386, 197, 67; 54/36

[56] References Cited
UNITED STATES PATENTS

| | | | |
|---|---|---|---|
| 1,642,089 | 9/1927 | Schreier | 210/64 |
| 2,387,714 | 10/1945 | Briggs | 210/501 |
| 2,528,847 | 11/1950 | Van Norden | 210/501 |
| 2,542,743 | 2/1951 | Weymouth | 210/503 |
| 2,548,965 | 4/1951 | Gaugler | 210/503 |
| 3,398,092 | 8/1968 | Lields | 210/64 X |
| 3,398,837 | 12/1964 | Adams | 210/497.1 X |
| 3,470,104 | 9/1969 | Domas | 210/502 |
| 3,572,510 | 3/1971 | Lyda | 210/502 |
| 3,616,936 | 11/1971 | Johansson et al | 210/504 |
| 3,715,037 | 2/1973 | Hu et al | 210/501 |

OTHER PUBLICATIONS

Encyclopedia of Chemistry, pp. 480–482, Reinhold Publishing Co., New York, 1966.
Encyclopedia Dictionary of Physics, pp. 429–431, Pergamon Press, London, 1961.

Primary Examiner—Theodore A. Granger

[57] ABSTRACT

An annular filter element includes a contiguous layer of gel impregnated filter media substantially concentric with a center passage. To remove viruses from a liquid, the liquid is passed through the layer of gel which is formed by the method of contacting the filter media with an aqueous solution containing colloidal particles of a polyvalent metal.

8 Claims, 3 Drawing Figures

PATENTED JUN 11 1974  3,816,304

INVENTOR.
CRAIG WALLIS
BY JOSEPH L. MELNICK
Robert E. Walter
David E. Daugherty

FILTERING METHOD

BACKGROUND OF THE INVENTION

The present invention relates to a filter element which is suitable for concentrating or removing viruses from fluid containing viruses.

The prior art processes of filtering fluids include mechanical entrapment which necessitates the use of openings smaller in size than the microorganism to be removed. The use of extremely small passageways cause a high pressure drop between the influent and effluent sides of the filter, low capacities, and rapid clogging of the minute passageways. Furthermore, filter media of this type are generally ineffective in removing smaller sized microorganisms such as viruses.

Other methods of removing viruses from fluids include chemical flocculation which utilizes a metal-virus complex which aggregates to form a separable precipitate. Metal precipitates which have been used include aluminum hydroxide, aluminum phosphate, calcium phosphate and other metal hydroxides and salts. In this method, the viruses are concentrated in a flocculate which is separated from the fluid by filtration or settling.

In addition to the above-described techniques, the principles of filter aid filtration have been used. Filter aids such as diatomaceous silica, perlite, and carbon and fibrous matter are coated with various organic compositions which create charged sites that attract viruses. The filter aids obviate some of the deficiencies of the flocculation method by aiding the formation of a filter cake. However, the filter aid techniques are generally uneconomical, time consuming, and require complex batch processes and have generally been found ineffective for removing a large variety of viruses.

SUMMARY OF THE INVENTION

According to the principles of the present invention, a filter element comprises an annular filter media with a center passage and a contiguous layer of filter media impregnated with a gel. Viruses are removed from a fluid containing viruses by passing the fluid through a layer of gel which is formed by contacting the filter media with an aqueous solution containing colloidal particles of a polyvalent material.

The present invention obviates many of the deficiencies associated with prior art methods of concentrating viruses. By using the filter cartridge of the present invention, viruses can be concentrated from large quantities of water since the viruses are adsorbed into the gel layer which is impregnated in the filter cartridge while other microorganisms and particulate can pass through the cartridge.

DETAILED DESCRIPTION OF A PREFERRED EMBODIMENT

Figure 1:
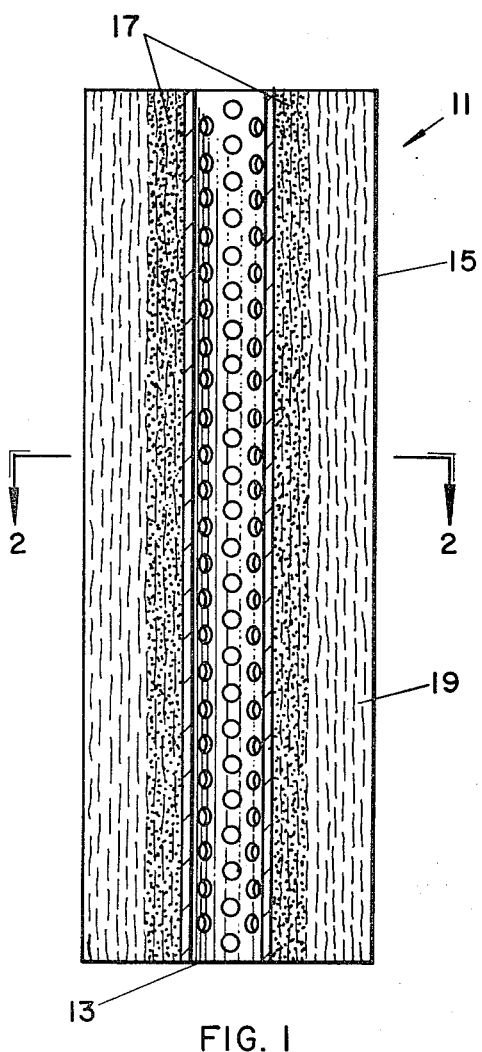
FIG. 1 is a side elevational view in section of a filter cartridge of the present invention.
Figure 2:
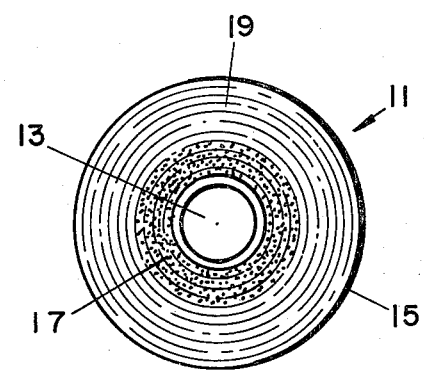
FIG. 2 is an end elevational view along section 2—2 of FIG. 1.

The filter element 11 of the present invention is annularly shaped with a center passage 13. The filter media 15 can comprise a variety of materials constructed in a variety of ways to form an annular filter element 11. The filter media 15 may be formed from woven or nonwoven material or a roving. In the former case the material is preferably spirally wound around a perforable support tube in successive layers. When a roving is employed, as illustrated in the drawings, the fiber is preferably wound in helical convolutions spaced along the core in one direction and then in the opposite direction in a criss-cross manner. This provides a honeycomb filter with diamond shaped openings between successive layers and results in passages extending from the outside of the unit to the inside thereof.

Figure 3:
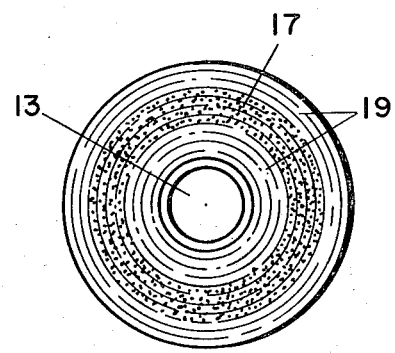
FIG. 3 is an end elevational view in section of a preferred embodiment with the gel in the middle portion of the filter element.

The filter media 15 is impregnated with gel which forms a layer 17 substantially concentric with the center passage 13. Preferably the impregnated layer 17 of gel is located upstream of an unimpregnated portion 19 of filter media 15. With this type of construction the chances of losing gel to the fluid being filtered are reduced since the unimpregnated portion 19 tends to adsorb sluffed off gel. In another embodiment of the present invention, as illustrated in FIG. 3, the layer of gel is located between radial portions of unimpregnated filter media. In this latter type of construction, the gel is firmly held in place even during backwashing.

The diameters of the pores in the filter media 15 are preferably from about 0.5 microns to about 20.0 microns. The porosity of the filter element is sufficient so that particulate and other coagulants in the fluid pass through the filter element while sufficient surface area of gel impregnated fiber is present to adsorb viruses from the fluid.

The gel can be formed from any polyvalent metal salt capable of forming a colloidal suspension which attaches to the filter media. Examples of typically useful salts are those of tri- and tetravalent metals such as iron, aluminum, zirconium, tin, and thorium. In preparing the colloidal gel from polyvalent metal salts, methods of forming colloidal aggregates which are well-known in the art may be used. These methods include mixing a metal halide with sodium carbonate, heating an aqueous solution of the hydrous metal oxide or adjusting the pH of a solution of metal ions to turbidity.

The concentration of the colloidal suspension varies somewhat with the metal used but ranges upward from about 10 parts per million concentration of metal ion per aqueous solution.

The gel may be impregnated into the filter element 11 by a variety of methods. The gel can be impregnated by contacting a preformed filter element 11 with a solution of the gel and applying the solution by brushing, injecting under a slight pressure, or soaking the cartridge so that the gel permeates through the filter media 15 forming a layer. In another method, the gel is impregnated into a predetermined length of roving used in forming a honeycomb cartridge or a predetermined length of cloth used in forming spirally wound filter cartridge. Since only a portion of the entire roving or cloth is impregnated, a layer is formed as the roving or cloth is made into a filter cartridge. By varying the amount of roving or material impregnated and the location of the impregnated section in relation to the overall length of roving or material, the thickness and location of the gel within the filter cartridge can be varied. For instance, if an intermediate portion of the roving is immersed in a bath of gel prior to winding the final wound filter element has an intermediate layer of impregnated gel with outer portions of unimpregnated filter media.

When an aqueous solution containing viruses is passed through the filter element 11 and the gel impregnated layer of filter media the viruses are adsorbed into the gel. The viruses are not removed from the gel by surging water, but can be removed when desired by the addition of a suitable elutant such as polyethylene glycol at a pH of 12. The viruses in the elutant can then be counted. Thus, the filter element of the present invention is ideally suited for removing viruses from a fluid, concentrating the viruses removed so that a determination of how many viruses were present in the original fluid can be made.

The following examples are illustrative of the invention and are not to be deemed limited thereof.

EXAMPLE 1

An aqueous solution of ferric chloride, at a concentration of about 0.002 moles per liter, is mixed with an equal volume of an aqueous solution of sodium carbonate at a concentration of about 0.01 moles per liter. The colloidal suspension which forms is soaked into the center portion of a glass fiber filter element (K-27, The Carborundum Company) for about 10 to about 30 minutes to form a gel impregnated layer about 0.25 inch thick.

EXAMPLE 2

About 3.8 liters of water containing about 10,000 infectious particles of poliovirus is passed through the gel impregnated filter of Example 1. The filter of Example 1 is supported in a Fulflo holder of The Carborundum Company so that water containing viruses first pass through the impregnated gel layer. No viruses were detected in the effluent from the filter cartridge. A polyelectrolyte method is used for concentrating and counting the viruses (see "Concentration of Virus from Sewage and Excretion on Insoluble Polyelectrolytes", *Applied Microbiology* by Wallis et al., December 1969, page 1007–1014).

Preferred embodiments of the present invention having been described and illustrated, it is to be realized that modifications thereof may be made without departing from the broad spirit and scope of this invention as described in the appended claims.

What is claimed is:

1. A method of concentrating viruses from fluid containing viruses comprising:
   a. forming an annular filter element with a center passage and a layer of gel impregnated filter media substantially concentric with the center passage, said layer of gel being formed by contacting said filter media with an aqueous solution containing colloidal particles formed by mixing equal volumes of aqueous solutions of ferric chloride and sodium carbonate, and
   b. passing fluid containing viruses through said layer of gel impregnated filter media whereby the viruses are removed from the fluid.

2. A method according to claim 1 wherein said layer is located upstream of at least a portion of said filter media.

3. A method according to claim 1 wherein said filter media comprises an overlapping winding of yarn.

4. A method according to claim 1 wherein said filter media comprises glass fiber.

5. A method according to claim 1 wherein said ferric chloride is present in a concentration of about 0.002 moles per liter and said sodium carbonate is present in a concentration of about 0.01 moles per liter.

6. A method for the preparation of gel impregnated annular filter media for the removal of viruses from fluids, said method comprising contacting said filter media with an aqueous colloidal suspension formed by mixing equal volumes of aqueous solutions of ferric chloride and sodium carbonate.

7. A method as set forth in claim 6 wherein said filter media comprises glass fibers.

8. A method as set forth in claim 7 wherein said ferric chloride is present in a concentration of about 0.002 moles per liter.

* * * * *